(12) United States Patent
Kovács et al.

(10) Patent No.: US 12,043,384 B2
(45) Date of Patent: Jul. 23, 2024

(54) COMBAT DRONE WITH COORDINATED TRANSMITTER AND RECEIVER

(71) Applicants: György Kovács, Györ (HU); György Kovács, Jr., Györ (HU); Kinga Kovács, Györ (HU)

(72) Inventors: György Kovács, Györ (HU); György Kovács, Jr., Györ (HU); Kinga Kovács, Györ (HU)

( * ) Notice: Subject to any disclaimer, the term of this patent is extended or adjusted under 35 U.S.C. 154(b) by 303 days.

(21) Appl. No.: 17/762,792

(22) PCT Filed: Sep. 22, 2020

(86) PCT No.: PCT/HU2020/000027
§ 371 (c)(1),
(2) Date: Mar. 23, 2022

(87) PCT Pub. No.: WO2021/058988
PCT Pub. Date: Apr. 1, 2021

(65) Prior Publication Data
US 2022/0402606 A1    Dec. 22, 2022

(30) Foreign Application Priority Data

Sep. 26, 2019 (HU) .................................. U1900184

(51) Int. Cl.
*B64C 39/02* (2023.01)
*A63H 27/00* (2006.01)
(Continued)

(52) U.S. Cl.
CPC ........... *B64C 39/024* (2013.01); *A63H 27/12* (2013.01); *A63H 30/04* (2013.01); *B64D 47/08* (2013.01);
(Continued)

(58) Field of Classification Search
CPC . G05D 13/62; B60K 31/0058; B66F 9/07572; B62B 5/0069
(Continued)

(56) References Cited

U.S. PATENT DOCUMENTS 10,197,998 B2 * 2/2019 Steele .................... G06F 3/0346
10,238,962 B2 * 3/2019 Steele .................... A63H 27/12
(Continued)

FOREIGN PATENT DOCUMENTS

CN          107050843 A    8/2017

*Primary Examiner* — Andrew Joseph Rudy
(74) *Attorney, Agent, or Firm* — Olson & Cepuritis, Ltd.

(57) ABSTRACT

The invention relates to drones for a combat game, preferably a drone (1) and at least one opponent drone (2), said drones comprising radio control means, signal transmitters, receivers, and cameras. The invention further relates to a system for a combat game, the system comprising a drone (1) comprising a weapon (3), and at least one opponent drone (2) comprising an opponent weapon (4), wherein the drones are equipped with radio control means, signal transmitters, signal receivers and cameras. The drones and the system are characterised in that the opponent signal transmitters (6) disposed on the opponent drone (2) and on an opponent weapon (4) are in control connection, via a control unit (15) of the drone (1), with the signal receivers (7) of the drone (1), the connection being adapted for transmitting the signals generated through targeting by an opponent player (26) utilizing a display (22) of the opponent player as control means, and for controlling the rotational speed, position, and operation of the light source (9), sound source (11), and smoke source (13) disposed on the drone (1), and the motors (19) of the propellers (17) thereof, and in that the signal transmitters (5) disposed on the drone (1) and on a weapon (3) are in control connection, via a control unit (16) of the opponent drone (2), with the opponent signal receivers (8) of the opponent drone (2), the connection being adapted for
(Continued)

transmitting the signals generated through targeting by a player (25) utilizing a player's display (21) as control means, and for controlling the rotational speed, position, and operation of the opponent light source (10), opponent sound source (12), and opponent smoke source (14) disposed on the opponent drone (2), and the opponent motors (20) of the opponent propellers (18) thereof.

4 Claims, 1 Drawing Sheet

(51) Int. Cl.
*A63H 30/04* (2006.01)
*B64D 47/08* (2006.01)
*B64U 101/30* (2023.01)
*G08C 17/02* (2006.01)

(52) U.S. Cl.
CPC ...... *B64U 2101/30* (2023.01); *B64U 2201/20* (2023.01); *G08C 17/02* (2013.01)

(58) Field of Classification Search
USPC .......................................................... 701/93
See application file for complete search history.

(56) References Cited

U.S. PATENT DOCUMENTS

| | | | |
|---|---|---|---|
| 11,548,633 B2* | 1/2023 | Ratti | B64B 1/44 |
| 2017/0182407 A1 | 6/2017 | Steele et al. | |
| 2017/0255198 A1* | 9/2017 | Rodriguez | G05D 1/0274 |
| 2019/0317529 A1* | 10/2019 | Matus | B64C 39/024 |
| 2020/0118571 A1* | 4/2020 | Huang | H04M 3/5175 |
| 2020/0277052 A1* | 9/2020 | Micros | B64C 33/025 |
| 2022/0100189 A1* | 3/2022 | Poornachandran | B64C 39/024 |

* cited by examiner

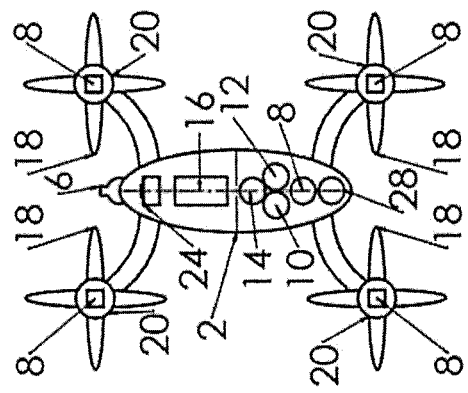
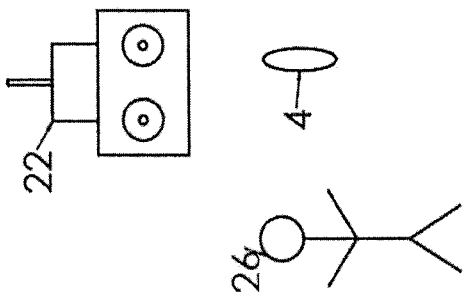
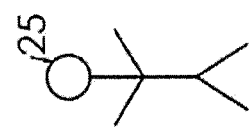
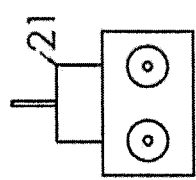
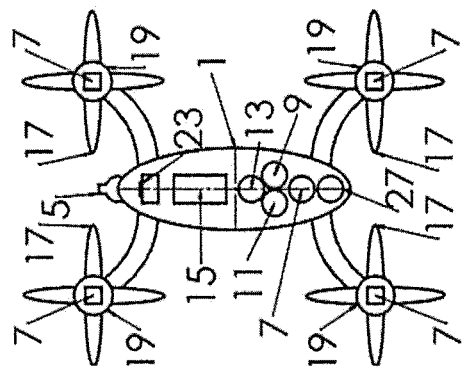

# COMBAT DRONE WITH COORDINATED TRANSMITTER AND RECEIVER

CROSS-REFERENCE TO RELATED APPLICATIONS

This application is a U.S. National Stage of PCT/HU2020/000027, filed Sep. 22, 2020, which claims priority to Hungarian Application No. U1900184, filed Sep. 26, 2019, each of which is incorporated herein by reference.

TECHNICAL FIELD OF THE INVENTION

The invention relates to drones for a combat game, preferably a drone and at least one opponent drone, said drones comprising radio control means, signal transmitters, receivers, and cameras.

The invention also relates to a system for a combat game, the system comprising a drone comprising a weapon, and at least one opponent drone comprising an opponent weapon, wherein the drones are equipped with radio control means, signal transmitters, signal receivers and cameras.

BACKGROUND ART

The technical solution disclosed in the publication document US2017182407 (A1) comprises controlling a drone in an augmented reality system utilizing a mobile phone, and also comprises a virtual game system. The drone is controlled by the player in relation to the augmented reality (AR) environment displayed on the mobile phone.

According to this technical solution the drone does not possess signal transmitters and signal receivers in operating and control connection with the drone, and does not comprise other additional components, for example light sources, sound sources, and smoke sources. Accordingly, this solution is not suited for life-like, spectacular combat sports games that can also be enjoyed by spectators.

A similar solution is disclosed in the publication document CN107050843 (A), wherein the drone is targeted by the player utilizing a laser "weapon", based on information specifying the drone's position. When a hit is detected by the sensors on the drone, a hit counter adapted for counting the hits is increased.

The apparatuses described above do not typically include solutions for combat games between drones, and they cannot be applied for realizing a true-to-life combat game wherein the drones suffering a hit enter a life-like dive with light, sound and smoke effects.

OBJECTIVE OF THE INVENTION

The objective of the invention is to provide such drones and such a system that allow for organizing life-like, spectacular combat game events that also provide enjoyment to the spectators. Applying the drones fulfilling the objective it is possible to hold and to simulate true-to-life combat games, wherein the player pilots the drone with the help of the image of the drone's camera that is displayed on a screen and carries out attacks utilizing virtual weapons.

The technical solution fulfilling the objective of the invention is based on the principle that several such components can be included which, when controlled appropriately, provide a more life-like experience. These include for example the light, sound and smoke effects that are activated when a hit is detected. The players utilize the signal transmitters ("weapons") disposed on their own drones for targeting and "shooting at" opponent drones. If a hit is detected by the signal receivers, the speed of the drone's propellers is reduced, and the light, sound and smoke effects are activated to make the hit more spectacular.

To realize the objective, certain signal transmitters disposed on the drones are coordinated with the signal receivers, with the signal receivers being adapted for controlling the light-, sound-, and smoke sources via the control unit.

The objective of the invention is realized by providing drones, preferably a drone and at least one opponent drone, said drones comprising radio control means, signal transmitters, receivers and cameras, wherein the opponent signal transmitters disposed on the opponent drone are in control connection, via a control unit of the drone, with the signal receivers of the drone, the connection being adapted for transmitting the signals generated through targeting by an opponent player utilizing a display of the opponent player as control means, and for controlling the rotational speed, position, and operation of the light source, sound source, and smoke source disposed on the drone, and the motors of the propellers thereof, and wherein the signal transmitters disposed on the drone are in control connection, via a control unit of the opponent drone, with the opponent signal receivers of the opponent drone, the connection being adapted for transmitting the signals generated through targeting by a player utilizing a player's display as control means, and for controlling the rotational speed, position, and operation of the opponent light source, opponent sound source, and opponent smoke source disposed on the opponent drone, and the opponent motors of the opponent propellers thereof.

In a preferred embodiment of the drones according to the invention the camera disposed on the drone is in connection with the player's display, the connection being adapted for displaying the images taken by the camera on said display and for controlling the camera and the signal transmitter, with the opponent camera disposed on the opponent drone being in connection with the opponent player's display, the connection being adapted for displaying the images taken by the opponent camera on said display and for controlling the opponent camera and the opponent signal transmitter.

In a further preferred embodiment of the drones according to the invention, a positioning device adapted for providing targeting aid, for calculating the position of aerial vehicles, and for data connection with the player's display is arranged on the drone, with an opponent positioning device adapted for calculating the position of aerial vehicles and for providing targeting aid being arranged on the opponent drone, said device being in data connection with the opponent player's display.

The objective of the invention is further realized by providing a system for a combat game, the system comprising a drone comprising a weapon, and at least one opponent drone comprising an opponent weapon, wherein the drones are equipped with radio control means, signal transmitters, signal receivers and cameras, wherein the opponent signal transmitters disposed on the opponent drone and on an opponent weapon are in control connection, via a control unit of the drone, with the signal receivers of the drone, the connection being adapted for transmitting the signals generated through targeting by an opponent player utilizing a display of the opponent player as control means, and for controlling the rotational speed, position, and operation of the light-, sound-, and smoke source disposed on the drone, and the motors of the propellers thereof, and wherein the signal transmitters disposed on the drone and on a weapon are in control connection, via a control unit of the opponent drone, with the opponent signal receivers of the opponent drone, the connection being adapted for transmitting the signals generated through targeting by a player utilizing a player's display as control means, and for controlling the rotational speed, position, and operation of the opponent light source, opponent sound source, and opponent smoke source disposed on the opponent drone, and the opponent motors of the opponent propellers thereof.

BRIEF DESCRIPTION OF THE DRAWINGS

The technical solution according to the invention is explained in detail referring to the attached drawing, where FIG. 1 shows a schematic depiction of a preferred embodiment of a drone primarily adapted for participating in combat games, the drone comprising radio control means, signal transmitters, signal receivers and cameras.

MODES FOR CARRYING OUT THE INVENTION

The essential feature of the system according to the invention is that—utilizing images and position information recorded by the drone's camera and shown on the player's display and utilizing said display as control means—the player can target the opponent drone and, by "hitting" it, can ultimately take it out of the game. Upon detecting a hit, the signal receiver of the opponent drone commands the opponent control unit to restrict the propellers of the opponent drone and, for a spectacular effect, turns on the opponent light source, the opponent sound source, and the opponent smoke source. At the same time, utilizing images and position information recorded by the opponent drone's camera and shown on the opponent player's display and utilizing said display as control means, the opponent player can target the drone in order to take it out of the game. Upon detecting a hit, the signal receiver of the drone commands the control unit to restrict the propellers of the drone and turns on the spectacular light, sound, and smoke sources.

In the case of the drones adapted for combat games illustrated in FIG. 1, comprising radio control means, signal transmitters, signal receivers and cameras, the signal receivers 7 adapted for detecting, by way of their coordination with the opponent signal transmitters 6, the signals of said transmitters disposed on the opponent drone 2 and on the opponent weapon 4, said signals being controlled by the targeting actions of the opponent player 26, are in control and operating connection, via the control unit 15, with the light source 9, the sound source 11, the smoke source 13 and the motors 19 of the propellers 17 disposed on the drone 1. The opponent signal receivers 8 of the opponent drone 2 and of the opponent weapon 4 adapted for detecting, in order to provide their coordination, the signals of the signal transmitters 5 disposed on the drone 1 and on the weapon 3, said signals being controlled by the targeting actions of the player 25, are in control and operating connection adapted for position and speed control, via the opponent control unit 16, with the opponent light source 10, the opponent sound source 12, the opponent smoke source 14 and the opponent motors 20 of the opponent propellers 18 disposed on the opponent drone 2.

The camera 23 disposed on the drone 1 is in connection with the player's display 21, the connection being adapted for displaying the images detected by the camera 23 on said display, and for controlling the camera 23 and the signal transmitter 5, while the opponent camera 24 disposed on the opponent drone 2 is in connection with the opponent player's display 22, the connection being adapted for displaying the images detected by the opponent camera 24 on said display, and for controlling the opponent camera 24 and the opponent signal transmitter 6.

A positioning device 27 adapted for providing targeting aid, for calculating the position of aerial vehicles, and for data connection with the player's display 21 is disposed on the drone 1, with an opponent positioning device 28 adapted for providing targeting aid, for calculating the position of aerial vehicles, and for data connection with the opponent player's display 22 being disposed on the opponent drone 2.

As can be seen in FIG. 1, a shot originating in the signal transmitter 5 of the drone 1 is detected by the opponent signal receiver 8 of the opponent drone 2 thanks to their coordination, followed by said receiver modifying, via the opponent control unit 16, the speed of rotation of the opponent propeller 18 of the opponent drone 2, and turning on the opponent light source 10, opponent sound source 12, and opponent smoke source 14. Likewise, a shot originating in the opponent signal transmitter 6 of the opponent drone 2 is detected by the signal receiver of the drone 1 thanks to their coordination, followed by said receiver modifying, via the control unit 15, the speed of rotation of the propeller 17 of the drone 1, and turning on the light source 9, sound source 11, and smoke source 13 of the drone 1. If targeting was accurate, the drone "suffers a hit", suddenly enters a dive and is put out of action.

The drone 1 and opponent drone 2 according to the invention can be operated by remote control, and are powered by batteries.

A great advantage of the drone according to the invention comprising a targeting signal transmitter and a signal receiver adapted for controlling the propeller motor is that it enables state-of-the-art digital game events to be performed outdoors, in stadiums, before a great number of spectators.

Digital games have improved a lot with the progress of civilization, but the drones configured according to the invention enable true-to-life combat game events that can be held outdoors, in stadiums or halls.

The invention fulfils the objective set before it because it allows for organizing civilized combat games utilizing drones, before a great number of spectators, and also as a live-streamed or broadcast event.

LIST OF REFERENCE NUMERALS 1 drone
2 opponent drone
3 weapon
4 opponent weapon
5 signal transmitter
6 opponent signal transmitter
7 signal receiver
8 opponent signal receiver
9 light source
10 opponent light source
11 sound source
12 opponent sound source
13 smoke source
14 opponent smoke source
15 control unit
16 opponent control unit
17 propeller
18 opponent propeller
19 motor
20 opponent motor
21 player's display
22 opponent player's display 23 camera
24 opponent camera
25 player
26 opponent player
27 positioning device
28 opponent positioning device

The invention claimed is:

1. A set of drones for a combat game comprising a first drone (1) and at least one opponent drone (2), each of said drones having radio control means, signal transmitters, receivers, and cameras, characterised in that an opponent signal transmitter (6) disposed on an opponent drone (2) is in control connection, via a control unit (15) of the first drone (1), with a signal receiver (7) of the first drone (1), the control connection being adapted for transmitting signals generated through targeting resulting in a hit by an opponent player (26) utilizing a display (22) of an opponent player as control means, and for controlling rotational speed of motors (19) and propellers (17) of the first drone, commanding a position, and operation of a light source (9), a sound source (11), and a smoke source (13) disposed on the first drone (1), and in that a signal transmitter (5) disposed on the first drone (1) is in control connection, via a control unit (16) of said opponent drone (2), with an opponent signal receiver (8) of said opponent drone (2), the control connection being adapted for transmitting signals generated through targeting resulting in a hit by a player (25) utilizing a display (21) of said player (25) as control means, and for controlling rotational speed of motors (20) and propellers (18) of said opponent drone, commanding a position, and operation of an opponent light source (10), an opponent sound source (12), and an opponent smoke source (14) disposed on an opponent drone (2).

2. The set of drones according to claim 1, characterised in that camera (23) on the first drone (1) is in connection with the display (21) of said player (25) on the first drone, the connection being adapted for displaying images taken by the camera on said display and for controlling the camera (23) and a signal transmitter (5), and an opponent camera (24) on said opponent drone (2) is in connection with the display (22) of said opponent player, the connection being adapted for displaying images taken by the opponent camera (24) on said display of an opponent player and for controlling the opponent camera (24) and the opponent signal transmitter (6).

3. The set of drones according to claim 1, characterised in that a positioning device (27) adapted for calculating the position of aerial vehicles and for providing targeting aid is disposed on the first drone (1), said device being in data connection with the player's display (21), and in that an opponent positioning device (28) adapted for calculating the position of aerial vehicles and for providing targeting aid is disposed on an opponent drone (2), said device being in data connection with the opponent player's display (22).

4. System for a combat game, the system comprising a first drone (1) having a first weapon (3), and at least one opponent drone (2) having an opponent weapon (4), wherein the drones are equipped with radio control means, signal transmitters, signal receivers and cameras, characterised in that an opponent signal transmitter (6) disposed on an opponent drone (2) and on an opponent weapon (4) are in control connection, via a control unit (15) of the first drone (1), with a signal receiver (7) of the first drone (1), the connection being adapted for transmitting signals generated through targeting by an opponent player (26) utilizing a display (22) of the opponent player as control means, and for controlling the rotational speed, position, and operation of a light source (9), a sound source (11), and a smoke source (13) disposed on the first drone (1), and a motor (19) and a propeller (17) thereof, and in that a signal transmitter (5) disposed on the first drone (1) and on a first weapon (3) are in control connection, via a control unit (16) of the opponent drone (2), with a signal receiver (8) of the opponent drone (2), the connection being adapted for transmitting signals generated through targeting by a player (25) utilizing a player's display (21) as control means, and for controlling the rotational speed, position, and operation of a light source (10), a sound source (12), and a smoke source (14) disposed on the opponent drone (2), and a motor (20) and a propeller (18) thereof.

* * * * *